(No Model.)
E. P. AUGER, Sr.
BOX FOR SHIPPING EGGS.
No. 302,815. Patented July 29, 1884.
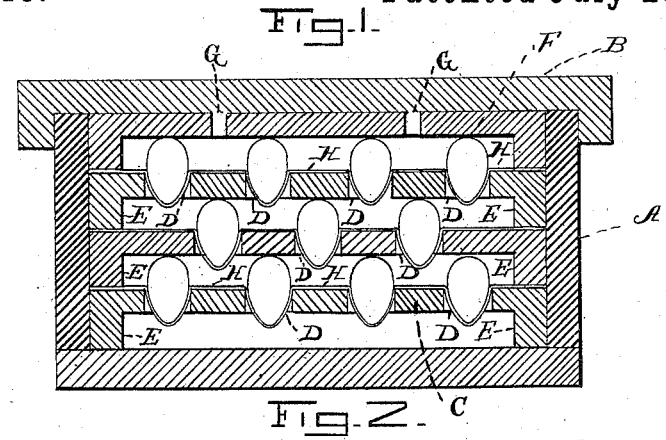
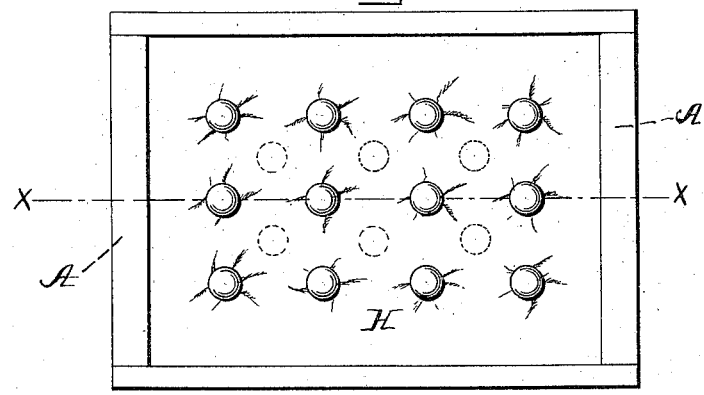
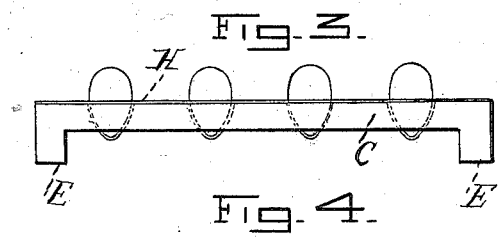
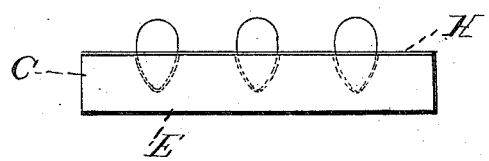
WITNESSES
N. A. Clark.
R. B. Turpin.
INVENTOR
Emery P. Auger, Sr.
By R. S. & A. P. Lacey
ATT'Y

UNITED STATES PATENT OFFICE.

EMERY P. AUGER, SR., OF JAFFREY, NEW HAMPSHIRE.

BOX FOR SHIPPING EGGS.

SPECIFICATION forming part of Letters Patent No. 302,815, dated July 29, 1884.

Application filed May 31, 1884. (No model.)

*To all whom it may concern:*

Be it known that I, EMERY P. AUGER, Sr., a citizen of the United States, residing at Jaffrey, in the county of Cheshire and State of New Hampshire, have invented certain new and useful Improvements in Boxes for Shipping Eggs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to egg-carriers; and it consists in the novel construction, combination, and arrangement of the parts, as will be hereinafter more fully described and claimed.

In the drawings, Figure 1 is a vertical longitudinal section of my carrier. Fig. 2 is a plan view of same with the lid and covering-tray removed. Fig. 3 is a side, and Fig. 4 an end, view of one of the trays.

In carrying my invention into effect I employ the rectangular box A, provided with a suitable lid, B.

The trays C may be of any desired number and are formed with vertical egg-openings D, and are provided with depending edge cleats or bars E, which may be made integral with said trays, as shown, or be secured thereto in any desired manner. The cover or top tray, F, is made with the depending cleats, but without the egg-openings D, in lieu of which I provide through it suitable ventilating-openings, G. Where desired, one of the egg-carrying trays may be used for this covering-tray, as will be understood.

Retaining-cloths H are placed over the egg-trays and made of a size to permit the depression thereof into the egg-openings, and its edges to extend out to the edges of the trays under the end cleat of the one next above it, so that said cloth will be held in the position shown in Fig. 1 by the tray next above it. This retaining-cloth may be of textile or other suitable fabric, and forms a convenient seat for the eggs and readily adjusts to the various sized eggs, as will be appreciated.

In operation eggs are placed in the lower tray until said tray is filled. The next tray is then put in, and its under side rests against the upper ends of the eggs of the lower tray and secures such eggs in place. It will be seen that the egg-openings in the adjacent trays are formed so that they will not register, as, if they registered, the lower ends of the eggs on one tray would butt against the upper ends of the eggs in the next lower tray.

In dotted lines, Fig. 2, I show one arrangement of the lower tray in connection with the upper one, so that the eggs will not interfere. I prefer this arrangement, though it may be varied at will without departing from the broad principles of my invention.

The number of trays and of egg-openings therein may be increased or diminished at will.

By my improvement it will be noticed I provide a simple safe carrier, into which the eggs may be easily packed and conveniently removed, as will be understood on reference to the drawings and the description before given.

Having thus described my invention, what I claim, and desire to secure by Letters Patent, is—

1. In an egg-carrier, the combination, with a series of trays arranged one above the other, and provided with egg-openings, of a series of removable retaining-cloths placed one on each tray and capable of being depressed into the egg-openings, the cloth covering each tray being held in place by the next upper tray, substantially as set forth.

2. The combination, with the trays having egg-openings and depending edge-cleats, of the retaining-cloths placed on the trays and depressed within the egg-openings and held by the edge-cleats of the next tray above, substantially as set forth.

In testimony whereof I affix my signature in presence of two witnesses.

EMERY P. AUGER, SR.

Witnesses:
JOSIAH K. RAND,
W. H. SHIRLEY.